United States Patent
Ahn et al.

(10) Patent No.: US 9,563,549 B2
(45) Date of Patent: Feb. 7, 2017

(54) DATA STORAGE DEVICE, USER DEVICE AND DATA WRITE METHOD

(75) Inventors: Kwang Soo Ahn, Seoul (KR); Hyun Jin Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 192 days.

(21) Appl. No.: 13/239,474

(22) Filed: Sep. 22, 2011

(65) Prior Publication Data

US 2012/0124276 A1    May 17, 2012

(30) Foreign Application Priority Data

Nov. 15, 2010  (KR) .......................... 10-2010-0113466

(51) Int. Cl.
   *G06F 12/02* (2006.01)
(52) U.S. Cl.
   CPC ... *G06F 12/0246* (2013.01); *G06F 2212/7201* (2013.01); *G06F 2212/7203* (2013.01)
(58) Field of Classification Search
   CPC .................. G06F 12/0246; G06F 2212/7203; G06F 2212/7201
   USPC ............................................. 711/5, 103, 206
   See application file for complete search history.

(56) References Cited

U.S. PATENT DOCUMENTS

| 7,188,228 | B1 |   | 3/2007  | Chang et al. |         |
|-----------|----|---|---------|--------------|---------|
| 2008/0098195 | A1 | * | 4/2008  | Cheon et al. | 711/202 |
| 2008/0270681 | A1 |   | 10/2008 | Van Acht et al. | |
| 2009/0193184 | A1 |   | 7/2009  | Yu et al. |       |
| 2010/0023676 | A1 | * | 1/2010  | Moon et al. | 711/103 |
| 2010/0023682 | A1 |   | 1/2010  | Lee et al. |      |
| 2010/0332732 | A1 | * | 12/2010 | Chiang et al. | 711/103 |
| 2011/0302476 | A1 | * | 12/2011 | Lee et al. | 714/763 |

FOREIGN PATENT DOCUMENTS

CN    101346703 A    1/2009
JP    2004-326165    11/2004

* cited by examiner

*Primary Examiner* — Michael Alsip
(74) *Attorney, Agent, or Firm* — Volentine & Whitt, PLLC

(57) ABSTRACT

Disclosed is an address mapping method for a data storage device using a hybrid mapping scheme. The address mapping method determines whether write data includes a defined super sequential block (SSB), and selects an address mapping mode for the write data in accordance with whether or not a SSB is present.

12 Claims, 17 Drawing Sheets

Fig. 8

|  | LBA | nSC | Buffer Layer | SSB | Mapping Mode |
|---|---|---|---|---|---|
| Data1 | 0 | 16384 | LBA_0 → LBA_16383 | SSB_0 | Block Mapping |
| Data2 | 8192 | 11809 | LBA_8192 → LBA_20000 | × | Page Mapping |
| Data3 | 8192 | 41809 | LBA_8192 → LBA_50000 | SSB_1, SSB_2 | Block Mapping Page Mapping |
| Data4 | 10000 | 6001 | LBA_10000 → LBA_16000 | × | Page Mapping |

DATA STORAGE DEVICE, USER DEVICE AND DATA WRITE METHOD

CROSS-REFERENCE TO RELATED APPLICATIONS

This application claims the benefit under 35 U.S.C §119 of Korean Patent Application No. 10-2010-0113466 filed Nov. 15, 2010, the subject matter of which is hereby incorporated by reference.

BACKGROUND OF THE INVENTION

Embodiments of the inventive concept relate to semiconductor memory devices, and more particularly, to semiconductor memory devices using address mapping techniques capable of increasing the efficiency of merge operations. Embodiments of the inventive concept also relate to data write methods performed in semiconductor memory devices using such address mapping techniques. Still other embodiments of the inventive concept relate to user devices that incorporate such semiconductor memory devices and/or data write methods.

Semiconductor memory devices may be characterized in their operative nature as volatile and non-volatile. Volatile memory devices generally perform read/write operations at high speed, but lose stored data in the absence of applied power. In contrast, non-volatile memory devices retain stored data in the absence of applied power. Accordingly, non-volatile memory devices are used to store data that must be retained regardless of power conditions. In particular, among the broad class of non-volatile memory devices, so-called flash memory devices are characterized by high memory cell integration density as compared with other types of EEPROMs. Thus, flash memory devices have proven particularly useful when incorporated into user devices and systems requiring mass data storage (e.g., use as auxiliary memory devices).

Contemporary flash memory devices operate in accordance with a defined erase unit (i.e., a data block size erased during an erase operation) and a defined write unit (i.e., a data block size written or programmed to during a write or program operation). A difference in block size between the erase unit and write unit generally necessitates the use of a specialized software tool commonly referred to as a flash translation layer or FTL.

The FTL is essentially an address mapping scheme that converts a given address (e.g., a logical address) defined in one domain into a corresponding address (e.g., a physical address) defined in another domain. Thus, in common use the FTL translates address types across domain boundaries. For example, a logical address (LA) defined by a host (e.g., a controller, processor, or high level application) may be converted back-and-forth with a corresponding physical address (PA) defined by an arrangement of memory cells in a flash memory device. Hence, the FTL converts respective, yet corresponding, addresses between a host domain and a flash memory device domain.

Address mapping may be accomplished using page mapping, block mapping, or hybrid mapping. A page mapping table is used for page mapping. That is, a page mapping table may be used to perform a mapping operation on a page by page basis between logical page addresses and corresponding physical page addresses.

A block mapping table is used for block mapping. That is, the block mapping table may be used to perform a mapping operation on a block by block between logical block addresses and corresponding physical block addresses.

Hybrid mapping methods essentially use both page mapping and block mapping techniques.

A memory block typically includes multiple pages. The size of a mapping table used for page mapping is therefore tens or hundreds of times larger than an analogous mapping table used for block mapping. Thus, a page mapping table will require a great deal more memory space than a block mapping table.

However, a memory block is rather large and constituent page locations within each block are fixed, despite frequent updates to the pages. For this reason, block mapping necessitates the use of many merge operations to ensure sufficient availability of memory space.

SUMMARY OF THE INVENTION

Recognizing the foregoing, certain embodiments of the inventive concept provide address mapping methods capable of increasing the efficiency of merge operations.

One aspect of embodiments of the inventive concept is directed to provide an address mapping method for a data storage device using hybrid mapping, the address mapping method comprising; determining whether the write data includes at least one super sequential block (SSB), and if the write data includes at least one SSB, using a block mapping mode to map a logical address associated with write data in the at least one SSB to a corresponding physical address, while using a page mapping mode to map a logical address associated with a residual portion of the write data excluding write data in the at least SSB to a corresponding physical address.

Another aspect of embodiments of the inventive concept is directed to provide an address mapping method for a system comprising a host and a data storage device using a hybrid mapping scheme, the address mapping method comprising; communicating a write command from the host to the data storage device, wherein the write command includes write data and a logical address for the write data, determining whether the write data includes at least one super sequential block (SSB), selecting a block mapping mode for mapping a first portion of the logical address associated with write data in the at least one SSB to a corresponding physical address, and selecting a page mapping mode for mapping a second portion of the logical address associated with a portion of the write data excluding write data in the at least SSB to a corresponding physical address.

Another aspect of embodiments of the inventive concept is directed to provide a data storage device comprising; a buffer memory configured to temporarily store externally provided write data having a logical address, a non-volatile memory device configured to store the write data, and a memory controller configured to map the logical address of the write data to a physical address of the non-volatile memory device, wherein the memory controller is further configure to select a block mapping mode for mapping a first portion of the logical address associated with write data in the at least one super sequential block (SSB) to a corresponding physical address, and to select a page mapping mode for mapping a second portion of the logical address associated with a portion of the write data excluding write data in the at least SSB to a corresponding physical address.

Another aspect of embodiments of the inventive concept is directed to provide a user device, comprising; a host configured to generate an address mapping mode indication and a logical address used to program write data in a non-volatile memory device, and a data storage device configured to select one of a plurality of mapping modes in accordance with the address mapping mode indication, and map the logical address to a corresponding physical address of the non-volatile memory device according to the selected one of the plurality of mapping modes.

BRIEF DESCRIPTION OF THE FIGURES

Certain embodiments of the inventive concept will be described in conjunction with the accompanying drawings.

FIG. 8 is a conceptual diagram illustrating possible relationships between a logical address for sequential data and a super consecution block.

DETAILED DESCRIPTION

Figure 1:
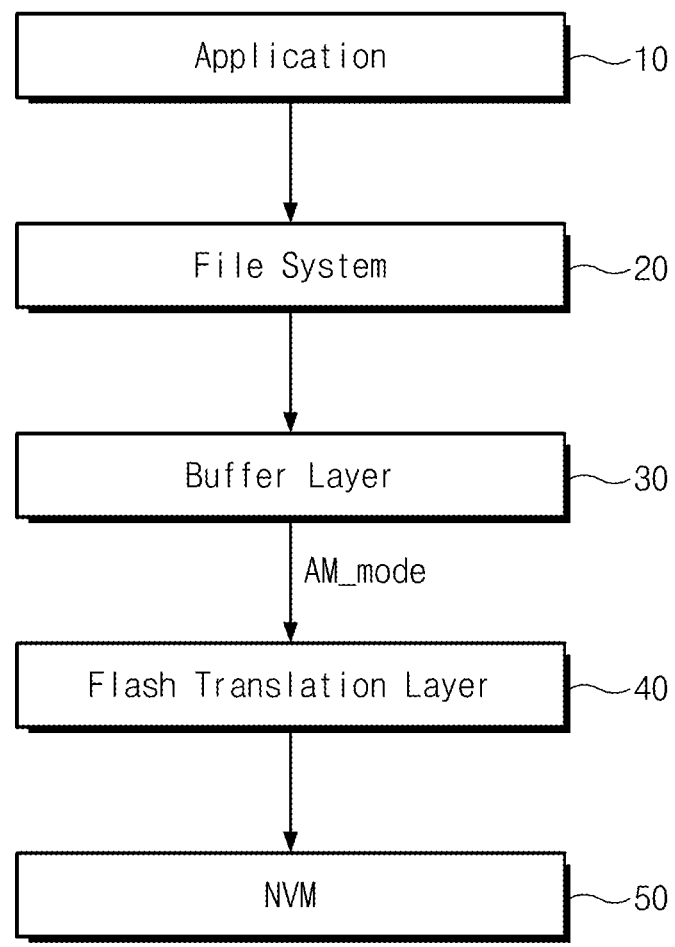
FIG. 1 is a conceptual diagram illustrating a hierarchical software structure according to an embodiment of the inventive concept.

The inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. In the written description and drawings, like reference numbers and labels are used to denote like of similar elements and steps.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereafter, certain embodiments of the inventive concept will be described assuming one or more flash memory device(s) as an operative example of all types of non-volatile storage media. Such nonvolatile storage media may be formed of other non-volatile memory devices such as PRAM, MRAM, ReRAM, FRAM, and NOR flash memory, or a memory system including different types of memories.

Write performance associated with mass data storage (e.g., media data) is one important consideration for non-volatile memory device, such as a NAND flash memory. Write performance for frequently updated data such as Meta data is another important consideration for non-volatile memory devices. Such frequently updated data may be written to a non-volatile memory device randomly. In certain embodiments of the inventive concept, hybrid mapping is used that selectively uses block mapping and page mapping according to one or more attribute(s) of the data being written to and/or read from memory.

In certain embodiments of the inventive concept, the write performance of a storage device using hybrid mapping will be determined in considerable measure by the efficiency (or lack thereof) with which a proper mapping mode can be determined during write operations. For example, it is possible to enhance write performance by efficiently selecting between a page mapping mode and a block mapping mode according to an identified attribute (e.g., a data pattern, size, and/or sequence) of the "write data" being communicated during a write (or program) operation. This is true because write performance is inherently predicated upon the type(s) of merge operations being used and/or the number of merge operations required. For example, it is possible to reduce the number of merge operations or the number of page copy operations by properly selecting an address mapping mode for particular write data.

FIG. 1 is a conceptual diagram illustrating a hierarchical structure for software running on a user device or system according to an embodiment of the inventive concept. Referring to FIG. 1, the software components of the user device include (from highest to lowest levels of abstraction) an application 10, a file system 20, a buffer layer 30, a flash translation layer (FTL) 40, and certain internal circuit level software controlling the programming and reading of memory cells in the non-volatile memory (NVM) 50.

An operating system (OS) layer may be functionally divided across the application 10 and file system 20. The file system 20 may be used to define a set of abstract data structures (e.g., a file system) facilitating the storage, search, access, and manipulation of data stored in the data storage device.

The buffer layer 30 may be used to manage data stored in a buffer memory according to requests and/or instructions received from the file system 20. For example, the buffer layer 30 may manage data stored in a working memory (e.g., a RAM) which is provided in the user device. Alternatively, the buffer layer 30 may manage data stored in a buffer memory (e.g., a RAM) provided in a data storage device. In particular, the buffer layer 30 may be used to determine an address mapping mode based on the size and type of the write data being stored in the working memory and/or buffer memory. That is, the buffer layer 30 may control a "mapping mode" (AM_mode) for the program/write operation being executed by the data storage device (e.g., selecting between available address mapping modes enabled by a hybrid mapping scheme). With the mapping mode being determined by the buffer layer 30, it is possible to reduce the number of copy/merge operations executed during page copying.

The flash translation layer (FTL) 40 may be used to provide one or more functional interface(s) between the file system 20, the buffer layer 30 and/or the non-volatile memory device 50. In functional operation, the FTL 40 essentially hides erase operations routinely performed by the non-volatile memory device 50 from the perspective of higher level software components. Using the FTL 40, it is possible to overcome many of the potential drawbacks associated with certain non-volatile memory device 50, like flash memory devices, such as an erase-before-write operating requirement, a size mismatch between the erase unit and write unit, etc. Further, during a write operation directed to the non-volatile memory device 50, the FTL 40 may be used to map a logical address generated by the file system 20 into a physical address of the non-volatile memory device 50. More particularly, the FTL 40 may be used to execute address for write data in accordance with an address mapping mode determined by the buffer layer 30.

With the above-described hierarchical structure of software, the buffer layer 30 and the FTL 40 may be used to cooperatively control address mapping of data in a data storage device. For example, the buffer layer may be used to detect or determine a particular "data attribute" (e.g., a size, a pattern, a type, etc.) for data being stored (or to be stored) in a working memory of the user device and/or a memory buffer of the data storage device (hereafter, singularly or collectively "buffered data"). The FTL 40 may be used to determine an address mapping mode in accordance with the detected data attribute for the buffered data. In this manner it is possible to reduce the operating overhead required for a merge operation by efficiently selecting a mapping mode in the context of a defined a hybrid mapping scheme. In this context, the buffer layer 30 may be "driven by" (i.e., invoked or caused to operate) by the user device or an interface of the data storage device.

Figure 2:
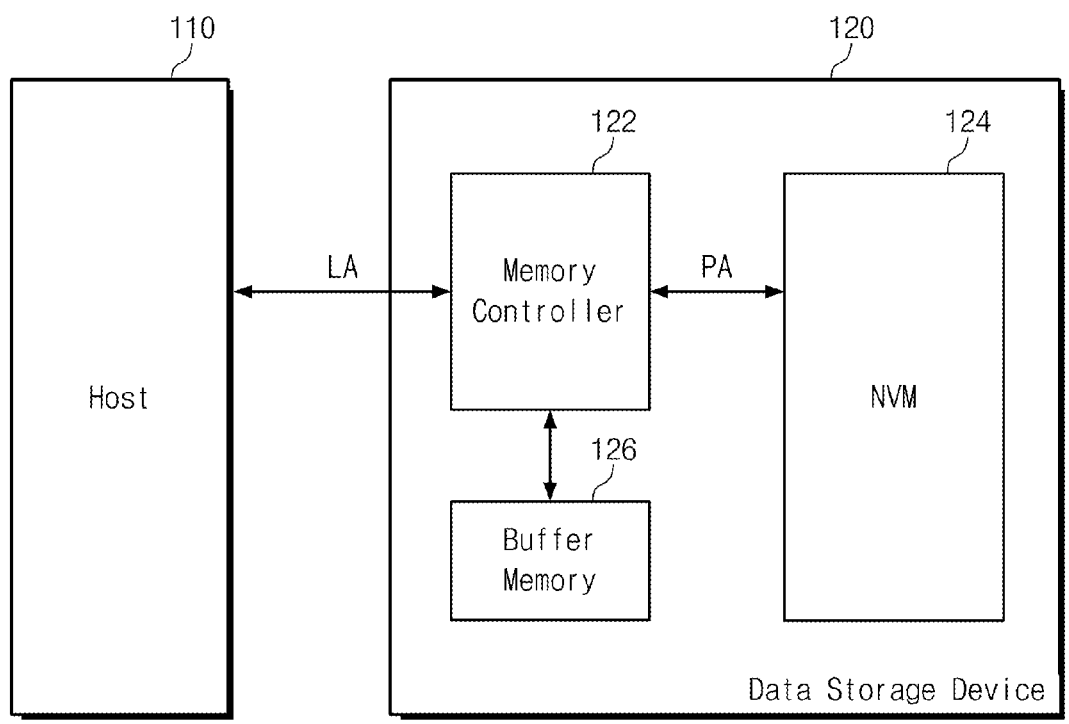
FIG. 2 is a block diagram of a data storage device according to an embodiment of the inventive concept.

FIG. 2 is a block diagram of a user device 100 according to an embodiment of the inventive concept. The user device generally includes a host 110 and a data storage device 120. The storage device 120 may include a memory controller 122, a non-volatile memory device 124, and a buffer memory 126.

Upon receiving a write request (i.e., a command or instruction indicating a write operation should be performed), the host 110 transfers write data and a corresponding logical address (LA) to the data storage device 120. If the user device 100 is, for example, a personal computer (PC) or a notebook, the logical address LA may be provided according to a sector number. That is, upon receiving a write request, the host 110 may provide a start address (LAB) for the write data and a sector number (nSC) to the data storage device 120.

The buffer memory 126 of the storage device 120 may be sued to "buffer" or temporarily store the write data received from the host 110. The buffered write data of the storage device 120 may then be written or programmed to the non-volatile memory device 124.

The memory controller 122 serves as an interface between the host 110 and the non-volatile memory device 124. The memory controller 122 typically responds to commands (like the write request, or a read request) received from the host 110 and accordingly controls operation of the non-volatile memory device 124 to effect storage and retrieval of data from the non-volatile memory device 124.

In particular, as the memory controller 122 controls the storing of write data provided from the host 110 to the buffer memory 126, its will determine a mapping mode to be used in conjunction with the write data. This determination of mapping mode may be made according to a detected data attribute for the buffered data. For example, if the write data has a size equal to or greater than a specified unit size it will be sequentially stored in the buffer memory 126. Then, the memory controller 122 may select a block mapping mode as an address mapping scheme for the buffered data stored in the buffer memory 126. Alternately, if write data has a size less than the specified unit size, it will be block stored in the buffer memory 126. Then, the memory controller 122 may select a page mapping mode as an address mapping scheme for the buffered data stored in the buffer memory 126.

Of further note, the non-volatile memory device 124 will also perform erase, read and write operations under the control of the memory controller 122. The data storage space provided by the non-volatile memory device 124 may be divided into a plurality of memory blocks, each memory block being further divided into a plurality of pages. If the non-volatile memory 124 is implemented using a plurality of non-volatile memory devices connected through multiple channels to the host 110, data written to any one of the constituent non-volatile memory devices may be controlled according to a data interleaving scheme in order to further enhance performance.

If a single channel is connected to the plurality of constituent memory devices, the memory devices may be connected via a common data bus using conventionally understood techniques. Hereafter an exemplary description is given in which one or more NAND flash memory devices are used to implement, at least in part, the data storage device 120 which in certain embodiments of the inventive concept may be used to good effect as a bulk media storage. Those skilled in the art will recognize that teachings and concepts identified in the following NAND flash memory example may be extended to data storage memories implemented, wholly or in part with other forms of non-volatile memory such as PRAM, MRAM, ReRAM, FRAM, and NOR flash memory. Certain data storage devices within the scope of the inventive concept will incorporate one or more volatile memory devices (e.g., DRAM).

Returning to FIG. 2, the buffer memory 126 may be used to temporarily store write data provided from the host 110 or read data retrieved from the non-volatile memory device 124. If read data retrieved from the non-volatile memory device 124 is cached in response to a read request by the host 110, the buffer memory 126 may then be used to provide the cached data directly to the host 100. That is, the buffer memory 126 may be used to implement a read data cache function, and/or a write data buffer function. However, access to the non-volatile memory device 124 is generally constrained on an operation by operation basis. As one read/write operation is being performed, another operation will not have access to non-volatile memory device 124. The speed with which data may be accessed from the non-volatile memory device 124, particularly when using a data bus structure and protocol (e.g., SATA or SAS), forms a considerable data access bottleneck, since the host 100 is capable of transferring data at more greater speed than that of the memory channel connecting the memory controller 122 with the data storage device 124. That is, given a much faster operating speed for the host 110, memory system performance is limited by the speed with which the memory channel (including a relatively large buffer memory 126) can operate.

In certain embodiments of the inventive concept, the buffer memory 126 will be implemented using one or more synchronous DRAMs (SDRAMs) in order to provide a sufficiently large write data buffer function and/or read data cache function between the host 110 and the data storage device 120. This is particularly true when the data storage device 120 is used to store and provide a large quantity of media data. Those skilled in the art, however, will understand that the buffer memory 126 may be variously implemented.

However, assuming the above description as a working example, the data storage device 120 will determine an address mapping mode according to a size or a pattern of the buffered data stored in the buffer memory 126. Here, the size or the pattern of the buffered data are convenient examples of a broad class of data attributes that may be used to determine an address mapping mode. In one approach consistent with an embodiment of the inventive concept, if write data has a sequential write pattern equal to or greater than (i.e., satisfying) a reference size, the write data will be managed using a block mapping table (e.g.) on a reference size unit by reference size unit basis. However, if the write data fails to have a sequential write pattern at least equaling the reference size, the write data will be managed using a page mapping table. The term "sequential write pattern" denotes a unit of data having contiguously arranged (i.e., sequential) address locations using any arbitrary address allocation scheme.

Using this approach, it is possible to reduce the number of merge operations associated with frequent page copying. Accordingly, where the overall performance of the memory system is largely defined by the efficiently of merge operation(s), it is possible to improve write performance. Further, the useful life of the non-volatile memory cells in the non-volatile memory device 124 may be extended by reducing the number of required merge operations.

Certain embodiments of the inventive concept may be used to implement a memory system operating as a solid state disk (SSD). In such embodiments, the memory controller 122 may be configured to communicate with an external device (e.g., the host 110) using one or more interface protocols such as USB, MMC, PCI-E, SAS, SATA, PATA, SCSI, ESDI, IDE, and the like.

Figure 3:
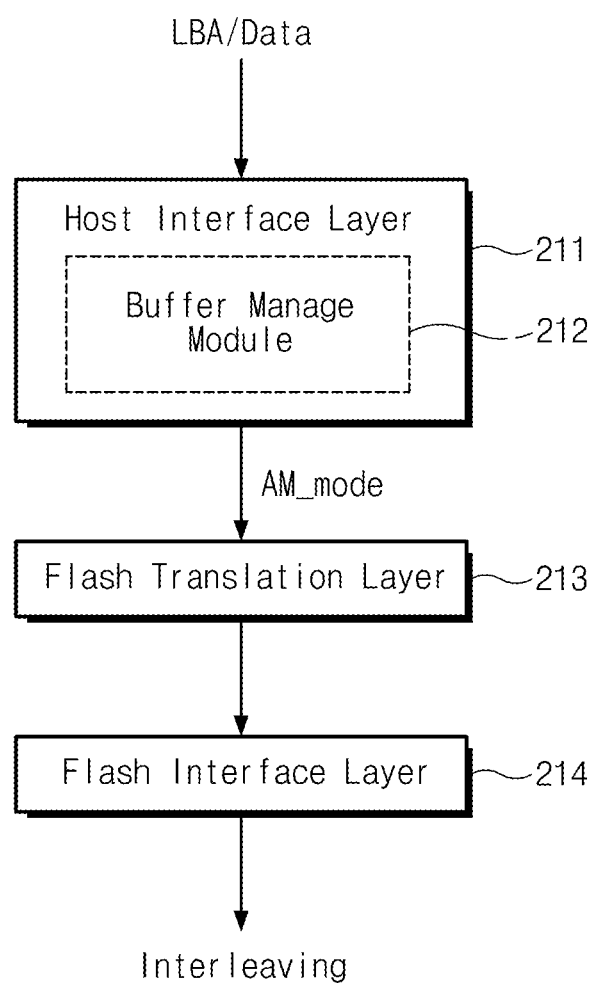
FIG. 3 is a conceptual diagram further illustrating the software structure of FIG. 1.

FIG. 3 is a conceptual diagram further illustrating the software structure of FIG. 1 in the context of the memory system of FIG. 2. These software layers may be run on a microcontroller and/or a collection of different control logic circuits (including memory controller 122) disposed in the host 110 and/or the data storage device 120. Referring to FIG. 3, a collection of software layers 200 is run, wholly or in part, using the memory controller 122 of FIG. 2. Thus, it is further assumed that the memory controller 122 includes hardware and/or software components capable of implementing a host interface layer 211, a flash translation layer 213, and a flash interface layer 214.

The host interface layer (HIL) 211 may be used to provide an interface between the host 110 and data storage device 120. The host interface layer 211 may also be used to control cache function(s) internal to the data storage device 120, and/or decode read requests and write requests provided by the host 110.

In order implement direct read data cache, the host interface layer 211 may be used to match buffered data (e.g., data previously stored in the buffer memory 126 as a function of a write request or a read request) stored in the buffer memory 126 with a "current" (e.g., just received) read request. If the requested data is identified as buffered data stored in the buffer memory 126, the host interface layer 211 may transfer the requested data directly to the host 110 without accessing the non-volatile memory device 124. This particular functionality may be controlled by a buffer manage module 212 included in the host interface layer 211.

The buffer manage module 212 may also be used to detect data attributes of the buffered data, such as a sequential write pattern of certain size. Accordingly, the buffer manage module 212 may selected an appropriate address mapping mode for the buffered data in response to the detected data attribution. If a sequential write pattern of certain size (e.g., equal to or greater than a reference size) is detected, the buffer manage module 212 will indicate a corresponding address mapping mode (AM_mode) to the FTL 213 and manage the buffered data according to a specific data unit using a block mapping table. Alternately in the case of a sequential write pattern being less than the reference size, the buffer manage module 212 may indicate a different address mapping mode (AM_mode) to the FTL 213 and manage the buffered data using a page mapping table or a random data mapping algorithm.

The FTL 213 will perform address mapping between a logical address LA received by the host interface layer 211 and a corresponding physical address used to actually write the buffered data to memory cells of the non-volatile memory device 124. Address mapping proceeds based on the selected address mapping mode. If the address mapping mode is a block mapping mode, the FTL 123 converts the logical address LA of write-requested buffered data (i.e., write data stored in the buffer memory 126 and indicated by a current write request) into a corresponding physical address on a block by block basis. If the address mapping mode is a page mapping mode, the FTL 123 converts the logical address LA of the write-requested buffered data into a corresponding physical address PA on a page by page basis.

Additionally, the FTL 213 may perform wear-leveling and garbage collection in response to read requests and/or write requests received from the file system 20 of the host 110. As is conventionally understood in the context of NAND flash memory systems, wear-leveling may be used to average memory cell usage according to (e.g.,) a count of erase operations for individual memory blocks of the non-volatile memory device 124. Garbage collection is also well understood and may be used to rationally group valid data scattered about the different memory blocks of the non-volatile memory device 124 and thereby condense the valid data into fewer memory blocks and make available larger blocks of free memory space.

The flash interface layer (FIL) 214 generally performs certain lower level operations enabling the interface between the memory controller 122 and the non-volatile memory device 124. For example, the flash interface layer 214 may include low level drivers (LLD) controlling hardware of the non-volatile memory device 124, certain error detection and correction (ECC) functions for use with read data retrieved from the non-volatile memory device 124, and/or bad block management (BBM) functions that track defective memory space. Under the control of the FTL 213, the flash interface layer 214 essentially controls the exchange of data between the memory controller 122 and the non-volatile memory device 124. In particular, if memory interleaving is performed during wrote and read operations across a plurality of individual memory devices and/or channels, the flash interface layer 214 may control the use of the multiple channels effecting the interleaving of data.

As noted above, the data storage device 120 may select an appropriate mapping mode (e.g., either a block mapping mode or a page mapping mode) based on the detected size of a sequential write pattern for buffered data stored in the buffer memory 126. The write operation management of the buffered data when a block mapping mode is selected may be accomplished using a swap/merge operation. Using this approach, it is possible to extend the useful life (e.g., avoid excessive wear) of the memory cells of the non-volatile memory device 124 by effectively reducing the number of page copy operations executed during a merge operation. The proposed approach also tends to increase the speed of required merge operations.

Figure 4:
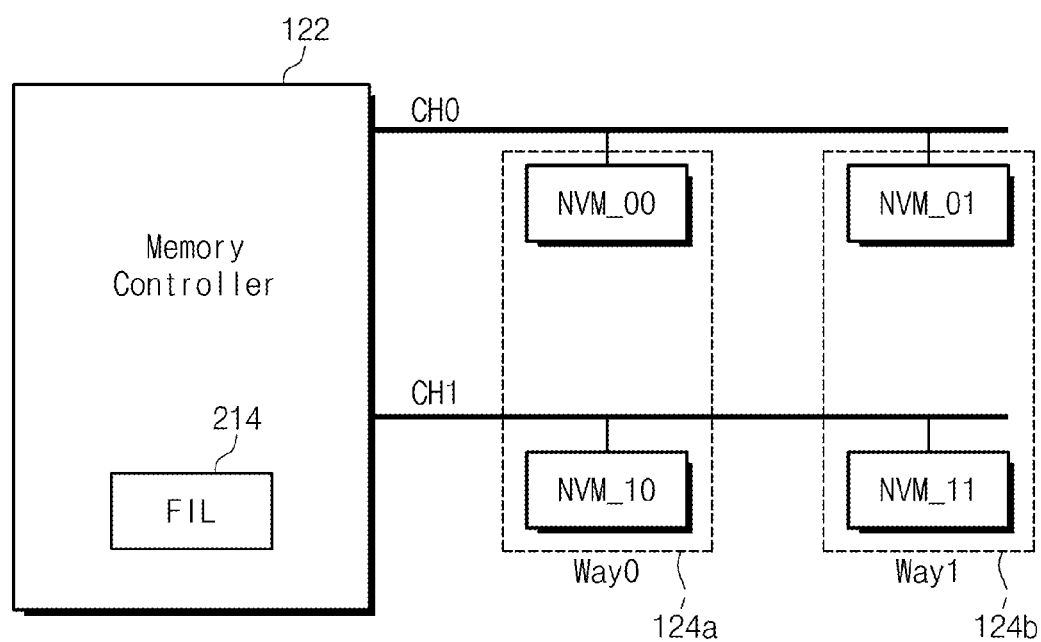
FIG. 4 is a diagram showing exemplary interconnections between a memory controller and non-volatile memory devices.

FIG. 4 is a bock diagram illustrating one possible set of interconnections between a memory controller 122 and a plurality of non-volatile memory devices using multiple channels. Referring to FIG. 4, the memory controller 122 is connected to non-volatile memory devices NVM_00, NVM_01, NVM_10, and NVM_11 via (e.g.) channels CH0 and CH1. Those skilled in the art will recognize that this simple example may be extended to any reasonable number and arrangements of channels and non-volatile memory devices.

The first channels CH0 is connected to input/output (I/O) ports (e.g., eight I/O ports) of each of the non-volatile memory devices NVM_00 and NVM_01. The second channels CH1 is connected to the I/O of each of the non-volatile memory devices NVM_10 and NVM_11. A memory controller 122 stores buffered write data from the buffer memory 126 in the non-volatile memory devices NVM_00, NVM_01, NVM_10, and NVM_11, It should be recognized that the write data may be stored in a distributed or scattered manner across the non-volatile memory devices NVM_00, NVM_01, NVM_10, and NVM_11. Data interleaving is one approach to writing data across multiple memories that will result in a scattering of data, and in particular once sequentially arranged data. For example, one or more data interleaving operation(s) may be performed on write data using the flash interface layer 214.

Data interleaving may be managed by channel, by non-volatile memory device, by an arrangement of memory devices called "a way", by memory bank, etc. To maximize the parallel distribution of write data across a number of non-volatile memory devices connected to one or more channels, the memory controller 122 may break up consecutively ordered write data (according to its logical address) to scatter it across multiple channels and memory devices. Alternately, the write data having a sequential write pattern of sufficient size (i.e., not less than a reference size) may be written after being broken into page size data across the non-volatile memory devices (e.g., NVM_00 and NVM_10) connected in a particular way (e.g., a first way 124a) using available channels (e.g., first and second channels CH0 and CH1). After one write operation is performed with respect to the first way 124a, page data may be written sequentially to the non-volatile memory devices NVM_01 and NVM_11 of the second way 124b via channels CH0 and CH1.

For example, if four pages of consecutively ordered (i.e., sequentially written) write data are received, a first of the four pages may be written to a first non-volatile memory device NVM_00 within the first way 124a via the first channel CH0. Before programming of the first page is complete, a second of the four pages may be written to a second non-volatile memory device NVM_10 within the first way 124a via the second channel CH1. Then, a third of the four pages may be written to a third non-volatile memory device NVM_01 within the second way 124b via the first channel CH0, now available after writing the first page. Before programming of the third page is complete, a fourth of the four pages may be written to a fourth non-volatile memory device NVM_11 within the second way 124b via the second channel CH1.

The foregoing is a simple and illustrative example of interleaving over 2-ways using 2-channels. Those skilled in the art will understand that much more complex interleaving may be performed across multiple devices, ways, and/or banks using multiple channels.

Figure 5:
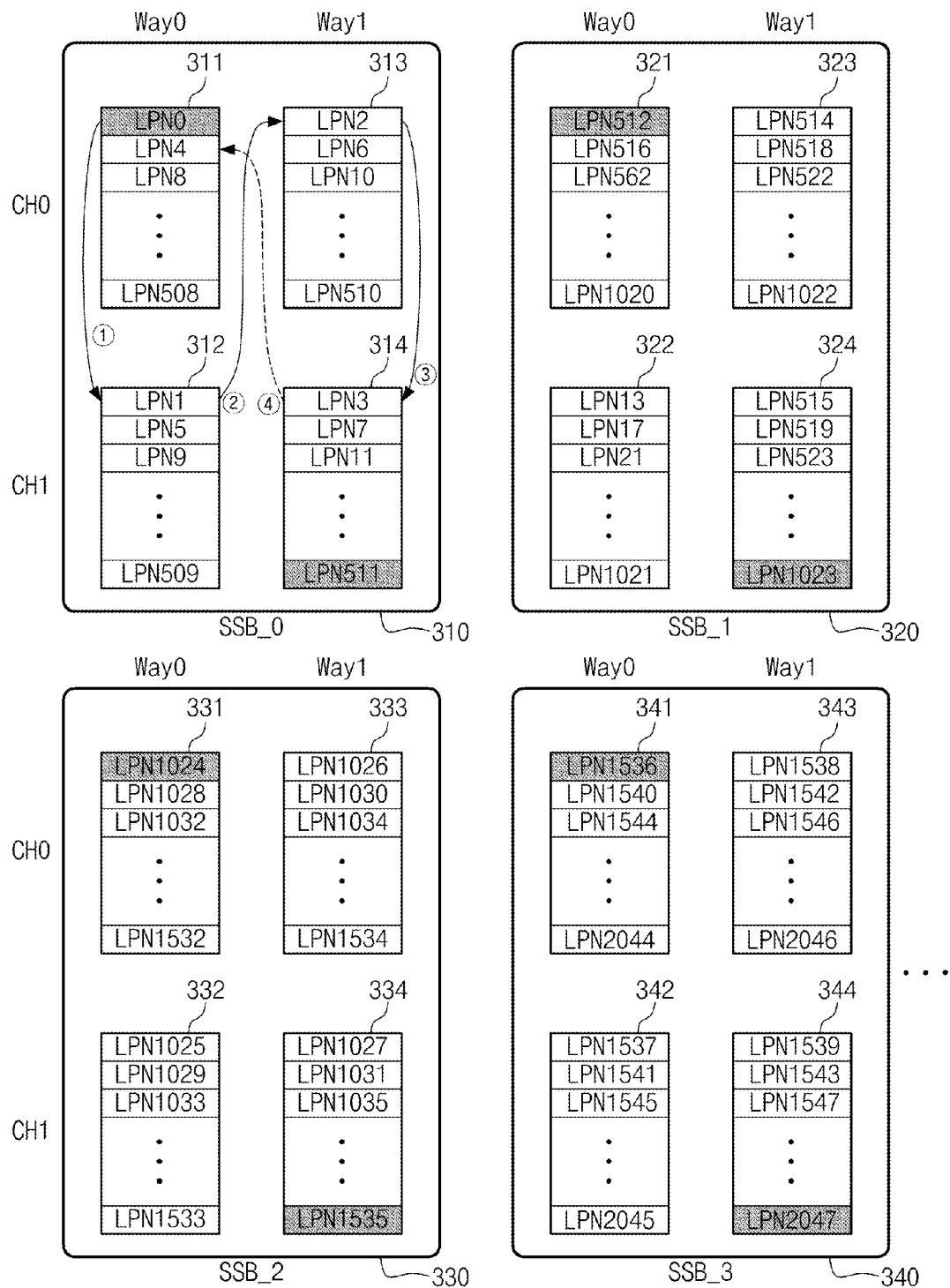
FIG. 5 is a conceptual diagram illustrating data interleaving techniques according to an embodiment of the inventive concept.

FIG. 5 is a conceptual diagram illustrating one possible approach to data interleaving according to an embodiment of the inventive concept. Referring to FIG. 5, a particular type of data unit may be defined to facilitate data interleaving. That is an interleaving unit formed by consecutive write data will be termed a "super sequential block" or SSB. A SSB may be defined as a unit of data that will completely fill a given memory block within constituent non-volatile memory devices of a memory system when a data interleaving approach to a write operation is used.

In one example of this approach, a single SSB is composed of write data having a sequential write pattern satisfying a reference size, wherein the reference size corresponds to an interleaving unit, or a unit of data sufficient to fully fill defined data units across a set range of interleaved devices, ways, or banks (e.g., four (4) memory blocks assuming the architecture of FIG. 4). Those skilled in the art will recognize that this is a simple example, but it suffices to teach the underlying concepts.

With reference to FIG. 5, a first super sequential block (SSB_0) 310 is formed of memory blocks 311, 312, 313, and 314 respectively disposed in corresponding non-volatile memory devices NVM_00, NVM_01, NVM_10, and NVM_11. If this data is stored as buffered write data in the buffer memory 126, it may be written sequentially to corresponding memory blocks in the defined interleaving pattern on a page by page basis. For example, a logical page LPN0 may be assigned to a memory block 311, a logical page LPN1 to a memory block 312, a logical page LPN2 to a memory block 313, and a logical page LPN3 to a memory block 314. A logical page LPN4 may be assigned to the memory block 311 given the four memory block structure of the example interleaving approach. Thus, a write order for the data forming the SSB is represented in FIG. 5 by the arrows (①→②→③→④→ ... ).

Stated in other terms, N (e.g., 512) pages of SSB data are sequentially written across M (e.g., 4) memory blocks in an interleaved manner, wherein the memory blocks are arranged in P ways connected by Q channels. N, M, P and Q being positive integers. In the foregoing example, the first SSB 310 completely fills (using the defined sequential data interleaving) four (4) memory blocks (311, 312, 313, and 314) respectively disposed in four (4) non-volatile memory devices (e.g., NVM_00, NVM_01, NVM_10, and NVM_11) as arranged in first and second ways via the first and second channels CH0 and CH1 on a page by page basis.

FIG. 5 shows a plurality of super sequential blocks SSB_0, SSB_1, SSB_2, and SSB_3. In accordance with an embodiment of the inventive concept, address mapping for the buffered write data identified as a super sequential block (SSB) is performed using a block mapping mode and a corresponding block mapping table. Alternatively, buffered write data is identified as "Not a SSB" and address mapping is performed using a page mapping mode and a corresponding page mapping table. Buffered write data may be identified as Not a SSB when it lacks the attribute(s) of a SSB, (e.g., when it has a sequential write pattern of a size less than a given reference size).

Figure 6:
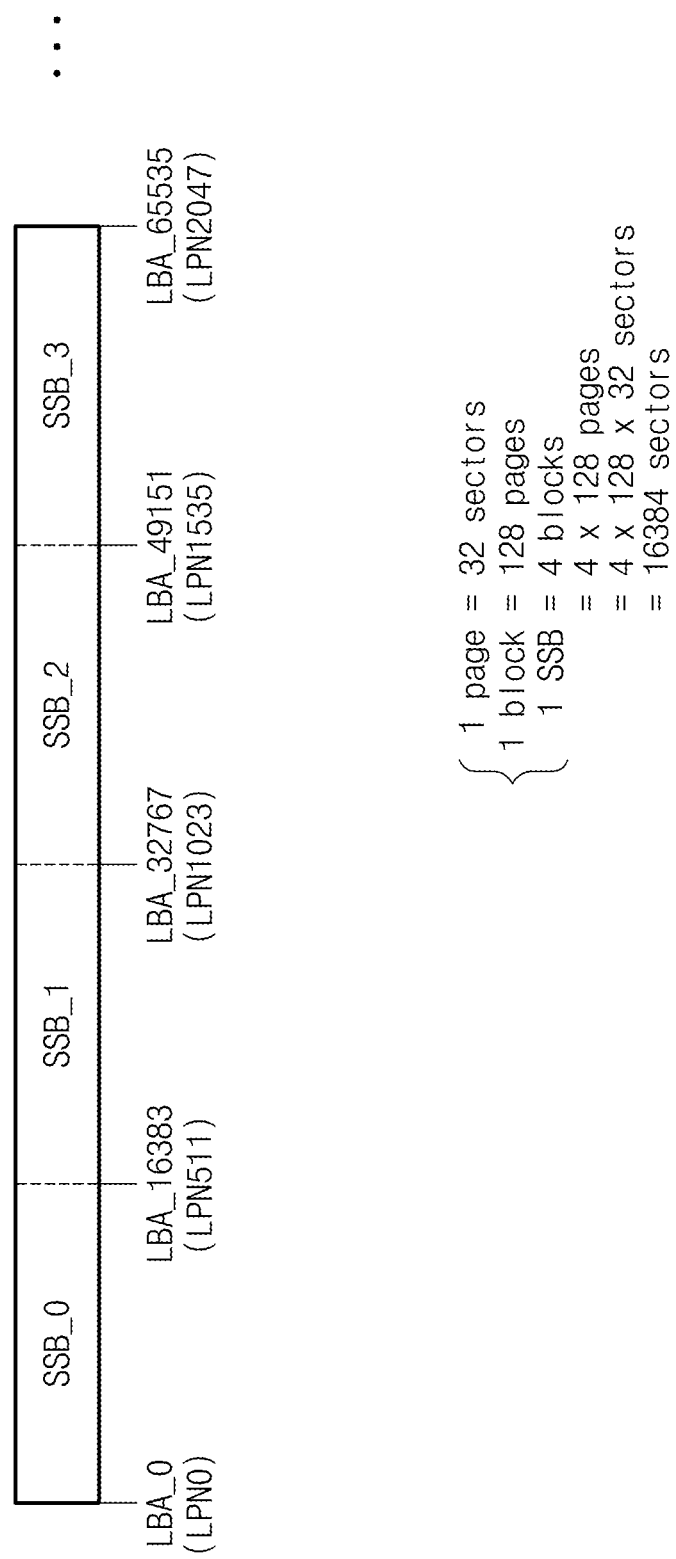
FIG. 6 is a conceptual diagram illustrating one possible relationship between a logic address and a super sequential block.

FIG. 6 is a conceptual diagram illustrating an exemplary relationship between a range of logic addresses for buffered write data and a super sequential block (SSB). In FIG. 6, a sequence of logical addresses provided by the host 110 are divided into a collection of super sequential blocks.

It is assumed that the sequence of logical addresses is provided from the host 110 by using a sector (e.g., 512-byte) identification approach. If one page is equal 32 sectors, then one block is equal to 128 pages, and one super sequential block SSB is equal to 16384 sectors. Accordingly, if a logical address range (LBA, nSC) for sequential write data has a size at least equal to one super sequential block SSB, then address mapping for the constituent write data within at least one SSB will be performed using a block mapping mode. On the other hand, if the logical address range (LBA, nSC) for the sequential write data has a size less than one SSB, then address mapping for the constituent write data will be performed using the page mapping mode.

Where a hybrid mapping scheme is used by a constituent FTL, physical addresses for the relevant memory blocks corresponding to the received logical address will be fixed. Accordingly, the address range for the super sequential block will also be fixed.

Figure 7:
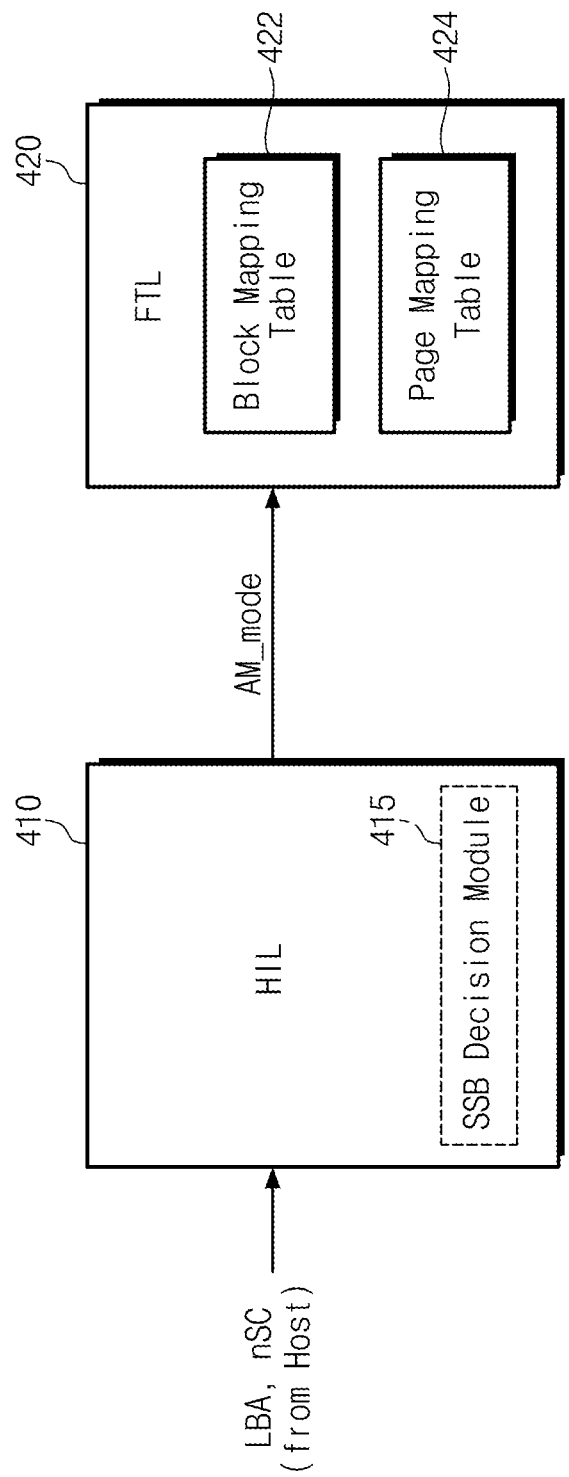
FIG. 7 is a system block diagram illustrating on approach to determining an address mapping mode for a buffer layer.

FIG. 7 is a block diagram further illustrating an approach to determining an appropriate address mapping mode as implemented by a buffer layer. In FIG. 7, an approach to mapping mode determination is described in the context of the host interface layer (HIL) 410 operating in response to a write request received from the host 110.

In conjunction with a write request, the host 110 will may send a logical address (LBA, nSC) and a write command to the data storage device 120. Herein, the LBA (logical block address) is a start address of a memory area in which write data is to be written, and is expressed as a HDD-based logical address. The nSC indicates a number of sectors in which write data is written beginning with the start address. So, the combination of the LBA and nSC may be used to indicate an "address area" in which the write data is stored.

The host interface layer 410 receive the logical address (LBA, nSC) provided from the host 110. The host interface layer 410 then stores the write data corresponding to the logical address (LBA, nSC) in the buffer memory 126. The host interface layer 410 then determines whether the buffered write data (e.g., the write data now stored in the buffer memory 126) constitutes a super sequential block SSB. This determination may be made upon consideration of the address area indicated by the logical address (LBA, nSC). That is a sequential write pattern occupying an address area at least equal in size to the defined SSB.

If all or a portion of the buffered write data constitutes one or more SSBs, the host interface layer 410 selects block mapping as the appropriate address mapping mode for the buffered write data associated with the at least one SSB. Otherwise, when the logical address and corresponding address area do not indicate a SSB, the host interface layer 410 selects page mapping as the appropriate address mapping mode for the buffered write data. Portions of the buffered write data exceeding an identified SSB (e.g., write data outside a designated SSB) but insufficiently large to constitute another full SSB may be designated by the host interface layer 410 for address mapping using the page mapping mode. Hence, the block mapping mode may be efficiently used to map SSBs, while page mapping is used to map non-sequential (i.e., random) write data or sequential data write data having a size less than a full SSB. In this manner, any block of data having a sequential write pattern may be effectively mapped by breaking the block into SSBs that are mapped using the block mapping mode, and then mapping any residual portion of said write data, having a size less than a SSB, using the page mapping mode.

As illustrated in FIG. 7, the host interface layer 410 may include a super sequential block (SSB) decision block 415 capable of identifying SSBs from the received logical address and then selecting an appropriate address mapping mode. The selected address mapping mode (AM_mode) may the n be communicated to the flash translation layer (FTL) 420.

The FTL 420 performs address mapping for the buffered write data in accordance with the address mapping mode AM_mode selected by the host interface layer 410. If the block mapping mode is selected as an address mapping mode for the buffered write data, the FTL 420 manages logical address conversion using a block mapping table 422. If a page mapping mode is selected as an address mapping mode for the buffered write data, the FTL 420 manage logical address conversion using a page mapping table 424.

FIG. 8 is a conceptual diagram illustrating the receipt of a logical addresses for four (4) different data units (Data1, Data2, Data3, and Data4), the identification of corresponding write data as having a sequential write pattern, the identification of super consecution blocks SSBs, and a corresponding selection of mapping mode. In FIG. 8, it is assumed that four sequential data unit Data1, Data2, Data3, and Data4 are stored in buffer memory 126 awaiting a respective determination of mapping mode before being written to the non-volatile memory 124.

Data1 is indicated by a logical address (LBA=0, nSC=16384). Given the foregoing assumptions regarding the definition of a SSB, all of Data1 is designated as SSB_0 and is mapped using the block mapping mode.

Data2 is indicated by a logical address (LBA=8192, nSC=11809). While the constituent write data of Data2 has a sequential write pattern, it is insufficiently large to constitute a full SSSB. Accordingly, it is mapped using the page mapping mode.

Data3 is indicated by a logical address (LBA=8192, nSC=41809). Here, two (2) full SSBs (SSB_1 and SSB_2) are identified from the sequential write data stored in the buffer memory 126. However, residual buffered write data remains from Data3 following the definition of the full SSBs that is insufficiently large to fill a third SSB. Under these circumstance, SSB_1 and SSB_2 will be mapped using the block mapping mode, while the residual sequential buffered write data is mapped using the page mapping mode.

Data4 is indicated by a logical address (LBA=10000, nSC=6001). Although Data4 has a sequential write pattern, like Data2, it is insufficiently large to fill a complete SSB. Accordingly, Data4 is mapped using the page mapping mode.

Figure 9:
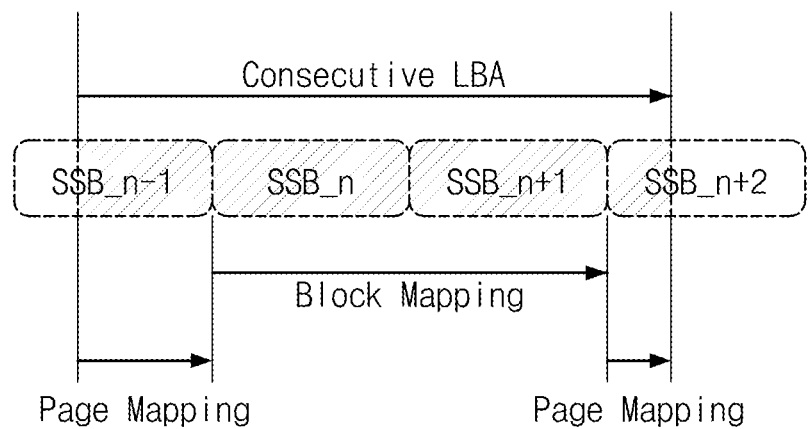
FIGS. 9 and 10 are diagrams illustrating address mapping schemes according to certain embodiments of the inventive concept.
Figure 10:
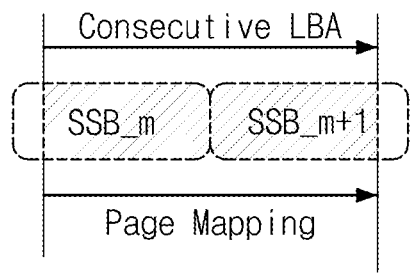

FIGS. 9 and 10 are conceptual diagrams further illustrating address mapping mode determinations according to certain embodiments of the inventive concept.

In FIG. 9, it is again assumed that the block mapping mode is used for address mapping of data that constitutes a SSB among sequentially input write data, and the page mapping manner is used for address mapping of data that does not constitute a SSB among the sequentially input write data.

A sequential write pattern may be noted in the write data stored in the buffer memory 126 as it extends in an unbroken range across a consecutive logical address ("Consecutive LBA"). Assuming a SSB definition made in relation to a defined sector addressing scheme of a file system, the buffered write data shown in FIG. 9 includes two (2) SSBs, SSB_n and SSB_n+1. The buffered write data of FIG. 9 also includes two residual write data portions that extend partially over but do not fill respective super sequential blocks SSB_n−1 and SSB_n+2. Given the data configuration and assumptions of FIG. 9, the block mapping mode will be used to map SSB_n and SSB_n+1, while the page mapping mode will be used to map the residual data "partially filling" SSB_n−1 and SSB_n+2. Thus, where a fixed arrangement of potential SSBs (i.e., an arrangement defined by a legacy sector based addressing scheme for instance), respective "filled" SSBs may be identified by address in relation to a unit of buffered write data.

This concept is further illustrated in FIG. 10. Here, SSB_m and SSB_m+1 are defined according to an existing partition of logical addresses. Although the unit of write data is greater than a reference size associated with a SSB, the range of the consecutive logical block address results in no filled SSBs and two (2) partially filled SSBs. Accordingly, the page addressing mode is selected.

For example, it is assumed that buffered write data of FIG. 10 has a size greater than a reference size for a SSB (e.g., 8 MBytes). But, since the logical address assigned to the buffered write data ranges only partially over both SSB_m and SSB_m+1, the buffered write data is not identified as a full super sequential block. In this case, the page mapping mode is selected for address mapping of the given buffered write data.

Figure 11:
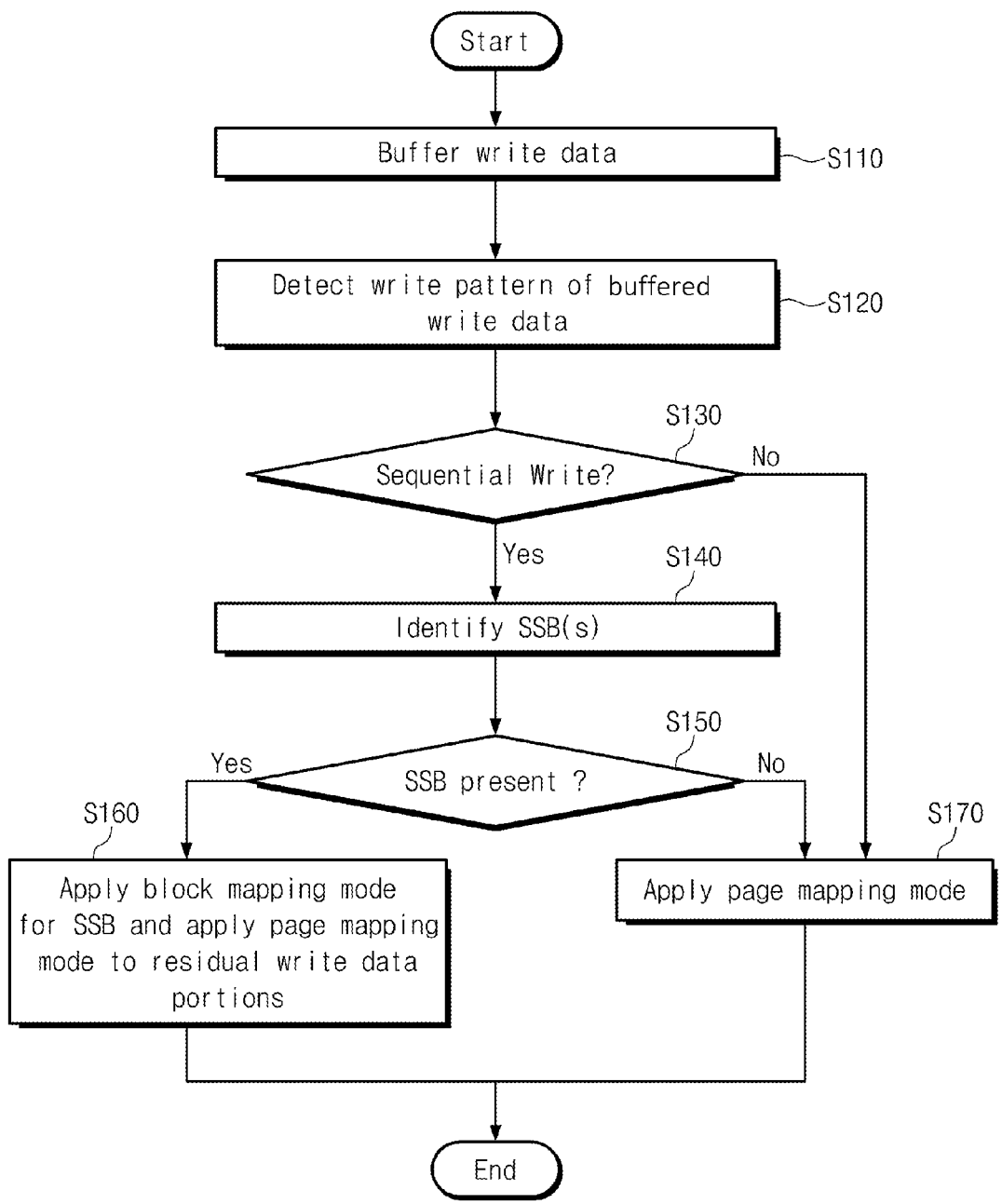
FIG. 11 is a flowchart summarizing an address mapping method according to an embodiment of the inventive concept.

FIG. 11 is a flowchart summarizing an address mapping method according to an embodiment of the inventive concept. Referring to FIG. 11, a buffer layer and flash translation layer may be used to determine an appropriate address mapping mode on the basis of a received logical address associated with write-requested data. It is assumed that the write data having the corresponding logical address is provided from the host 110 and the memory controller 122 (FIG. 2) performs an address mapping operation.

In operation S110, the memory controller 122 temporarily stores the write data in the buffer memory 126 in response to a received write request from the host 110.

In operation S120, the memory controller 122 detects a sequential write pattern in the buffered write data. For example, the memory controller 122 may determine whether the buffered write data corresponds to a sequential write pattern or a random write pattern on the basis of the logical address associated with the buffered write data.

In operation S130, if the buffered write data is determined to be non-sequential or random, the page mapping mode is selected S170. However, if the buffered write data is determined to be sequential, a determination is made as to whether the buffered write data includes one or more super sequential block SSB.

In operation S140, the memory controller 122 identifies whether one or more SSBs is present in the buffered write data on the basis of the logical address (LBA, nSC) provided from the host 110. According to certain file system and/or memory system definitions, the logical address for the buffered write data may fill or partially fill one or more super sequential block SSBs having fixed address values. Accordingly, the memory controller 122 may identify one or more super sequential blocks SSBs within the buffered write data based on its logical address.

In operation S150, the memory controller 122 determines whether one or more SSBs is present in the buffered write data. If not, the page mapping mode is selected for use by the FTL to perform address conversion on the buffered write data, S170. Otherwise, if the buffered write data includes one or more identified SSBs, the block mapping mode is selected for use by the FTL to perform address mapping for portions of the buffered write data identified in a SSB, while residual portions of the buffered write data are mapped using the page mapping mode, S160.

As may be understood from the foregoing, the identification of super sequential block(s) in buffered write data may be made on the basis of write pattern and size. A page mapping table may be used to map buffered write data that is not a SSB dues to its pattern, size or address location. A block mapping table may be used to map buffered writ data in identified super sequential block(s). A swap/merge operation may be performed for memory blocks using the block mapping mode. Accordingly, it is possible to markedly reduce a number of page copy operations otherwise required for a merge operation.

Figure 12:
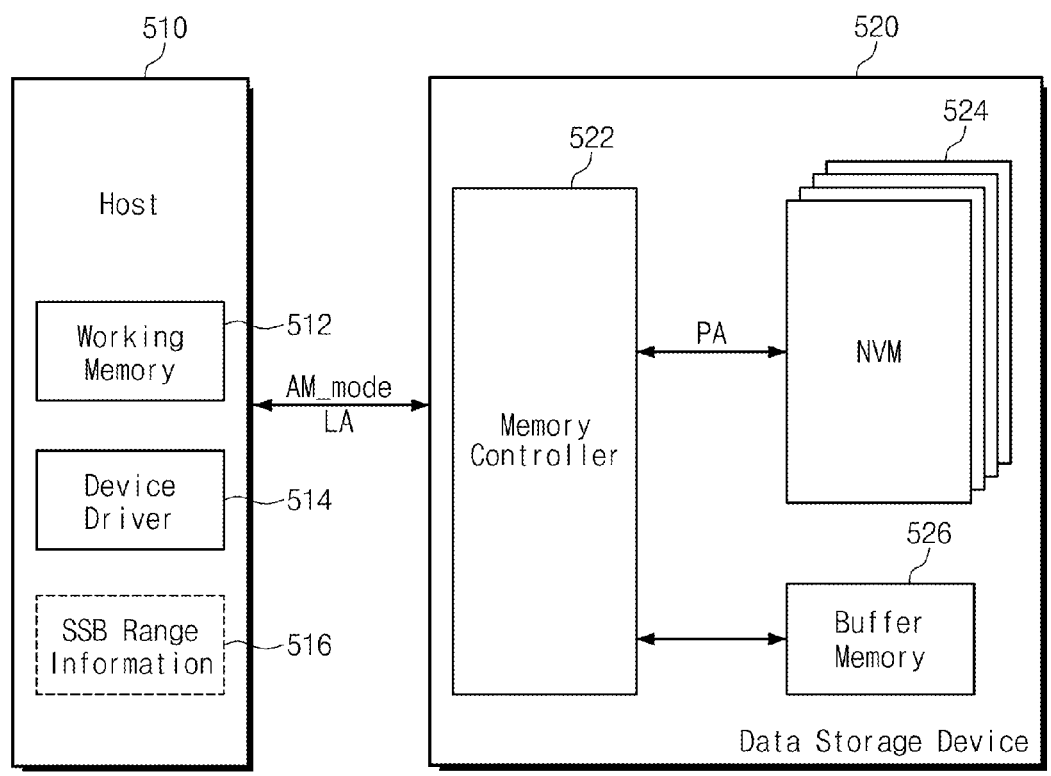
FIG. 12 is a block diagram of a user device incorporating a data storage device according to an embodiment of the inventive concept.
Figure 15:
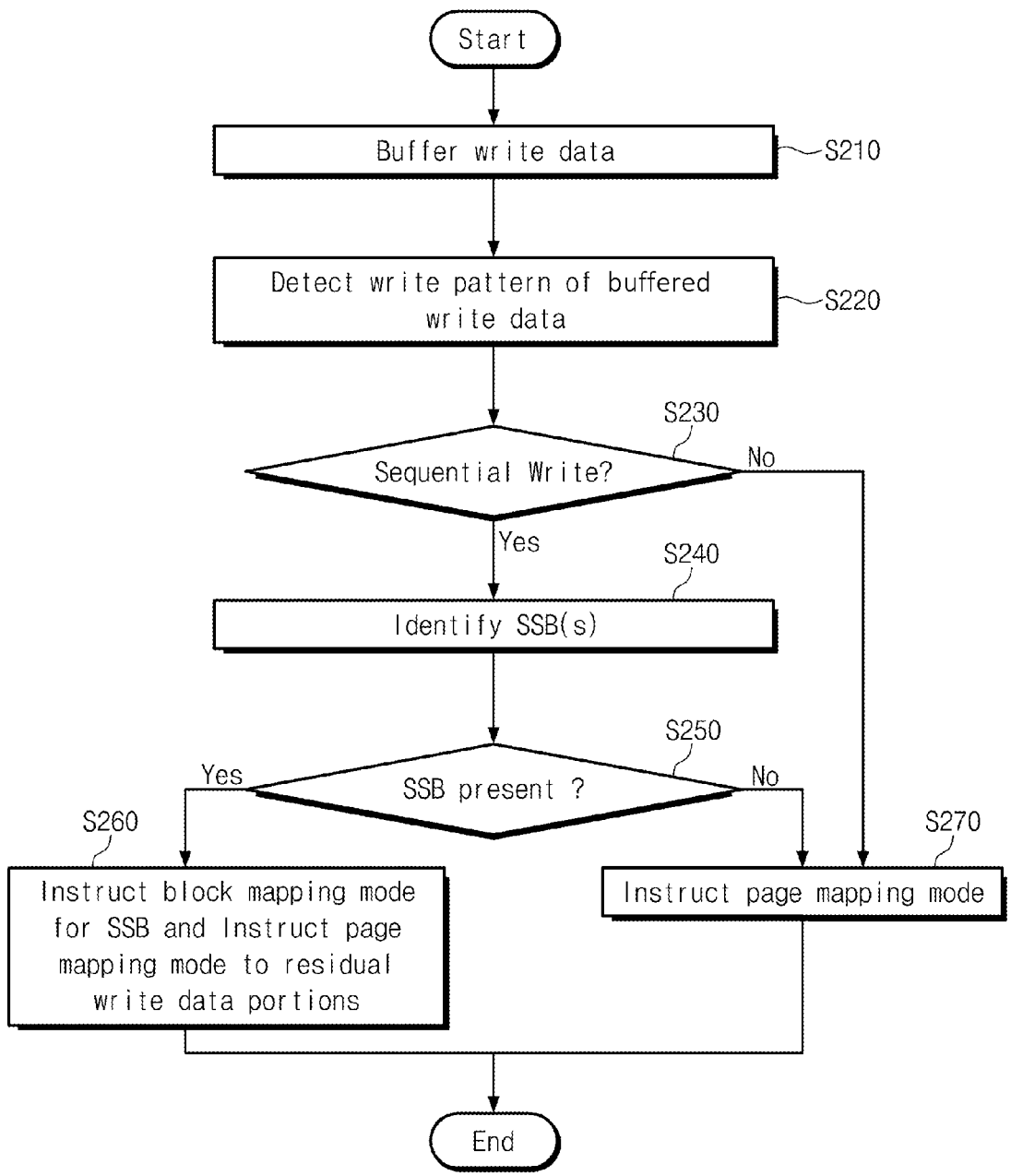
FIG. 15 is a flowchart summarizing an address mapping method according to another embodiment of the inventive concept.

FIG. 12 is a block diagram of a user device according to an embodiment of the inventive concept. Referring to FIG. 15, a user device 500 comprises a host 510 and a data storage device 520. The storage device 520 may include a memory controller 522, a non-volatile memory device 524, and a buffer memory 526.

At a write request, the host 510 may send write data and a logical address LA to the storage device 520. But, the host 510 may generate a write request on a file system before it is sent to the storage device 520. Further, before write-requested data is transferred to the storage device 520, it may be stored in a working memory 512 of the host 510. The host 510 may judge an address mapping mode of the storage device 520 based on data stored in the working memory 512. That is, the host 510 may decide an address mapping mode for the write-requested data or a part of the write-requested data, based on information generated when the write-requested data is stored in the working memory 512 of the host 510.

For example, a device driver 514 of the host 510 may identify a super sequential block based on a logical address associated with write data buffered in the working memory 512. (In this regard, it should be noted that "buffered write data" may be variously stored in memories of the host 510 and/the data storage device 520). In order to perform this function, the host 510 may include a super sequential block (SSB) address table 516 containing a listing of defined logical address ranges corresponding to super sequential blocks.

The device driver 514 then determines an appropriate mapping mode for the buffered write data by comparison with the SSB address table 516. Upon communicating a write request associated with the buffered write data, the device driver 514 may also indicate an address mapping mode (AM_mode) to the storage device 520.

The memory controller 522 of the data storage device 520 provides an interface between the host 510 and the non-volatile memory device 524. The memory controller 522 will typically perform address mapping between a logical address and a physical address based on a received logical address (LBA, nSC) included with the write request and in view of an indicated mapping mode.

The non-volatile memory device 524 performs erase, read, or write operations under the control of the memory controller 522. The non-volatile memory device 524 may include a plurality of memory blocks each of which includes a plurality of pages. In the event multiple non-volatile memories are coupled by multiple channels, the non-volatile memory device 524 may be controlled according to a memory interleaving function to enhance performance.

The storage device 520 includes a buffer memory 526. Further, the appropriate mapping mode may be determined by the host 510 when the data storage device 520 lacks sufficient computational resources.

Figure 13:
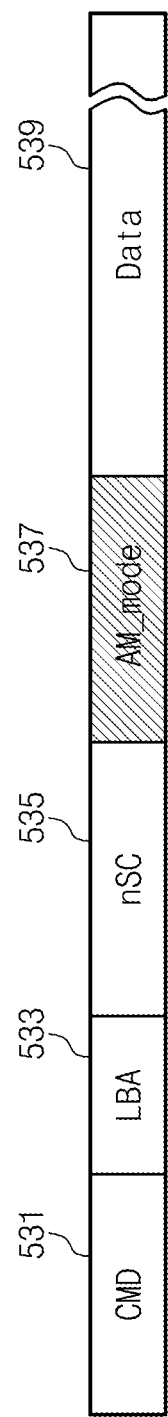
FIG. 13 is a diagram illustrating one possible format for a write request transferred from a host to a data storage device.

FIG. 13 is a conceptual diagram illustrating one possible format for a write request communicated from a host to a data storage device. Referring to FIG. 13, the write request may include a write command 531, a logical address (533, 535), an address mapping mode indication 537, and write data 539.

The address mapping mode indication 537 may include, for example, different address mapping modes for respective portions of the write data having particular logical addresses. That is, the address mapping mode indication 537 may be associated with multiple data regions corresponding to a logical address (LBA, nSC).

Figure 14:
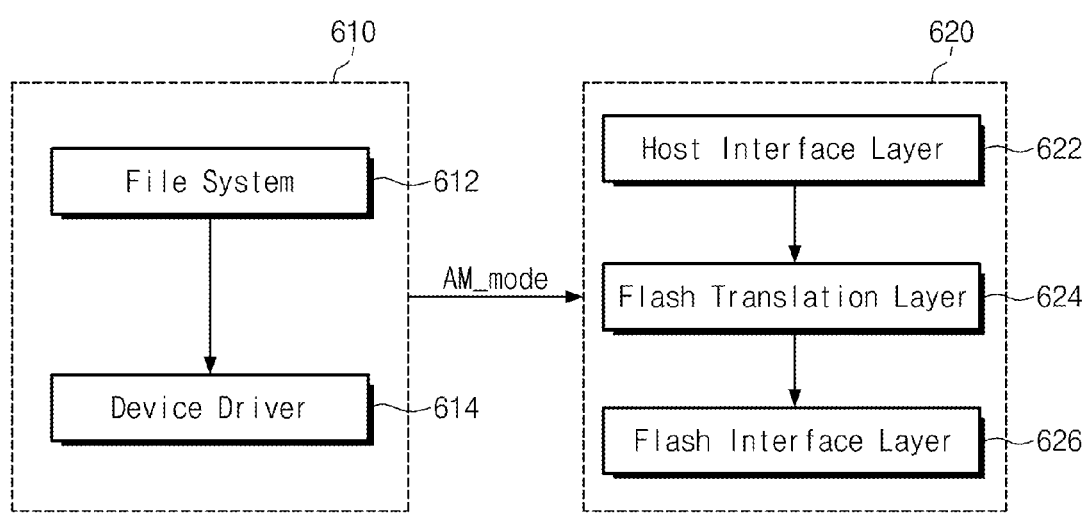
FIG. 14 is a block diagram illustrating a software layer structure for the user device of FIG. 12.

FIG. 14 is a block diagram of a software layer structure that might be used in conjunction with the user device of FIG. 12. Referring to FIG. 14, a host layer 610 includes a file system 612 and a device driver 614. A data storage device layer 620 may include a host interface layer 622, a flash translation layer 624, and a flash interface layer 626.

The file system 612 may generate an access request to a data storage device 520 upon file generation and deletion, for example. If a write request for a file in a buffer memory of the host 510 is made, the file system 612 may send a write request for a corresponding file to the device driver 614. The device driver 614 may determine whether the write data includes one or more SSB(s) based on the logical address of the write data and the definition of super sequential blocks SSBs. The device driver 614 may then determine an address mapping mode for all of or defined portions of the write data. The determined address mapping mode is then sent to the data storage device layer 620 when the write request command is provided.

The data storage device layer 620 may then map the logical address of the write data to a corresponding physical address in the non-volatile memory device(s) in response to the write request communicated by the host 510. The write data may then be programmed in the non-volatile memory device(s) using, for example, an interleaving function applied to the physical address. To accomplish this functionality, the data storage device layer 620 may include a host interface layer 622, a flash translation layer 624, and a flash interface layer 626 operating as previously described.

Thus, determinations of SSBs and corresponding determinations of mapping mode may be made in the host 510 or in the data storage device 520 depending on relative resource availability, memory system architecture, and system operating constraints.

FIG. 15 is a flowchart summarizing another address mapping method according to an embodiment of the inventive concept. Respective steps of the exemplary method summarized in FIG. 15 are analogous to those described with reference to FIG. 12, except for the operative nature of the steps S260 and S270. Those skilled in the art will appreciate that these steps are host-centric, as compared with steps S160 and S170 of FIG. 11 which are data storage device-centric. Namely, the host 510 of FIG. 12, for example, will "instruct" the data storage device 520 to use either page mapping or block mapping as part of a competent write request command. The data storage device 520 will then map and store the received write data accordingly.

Figure 16:
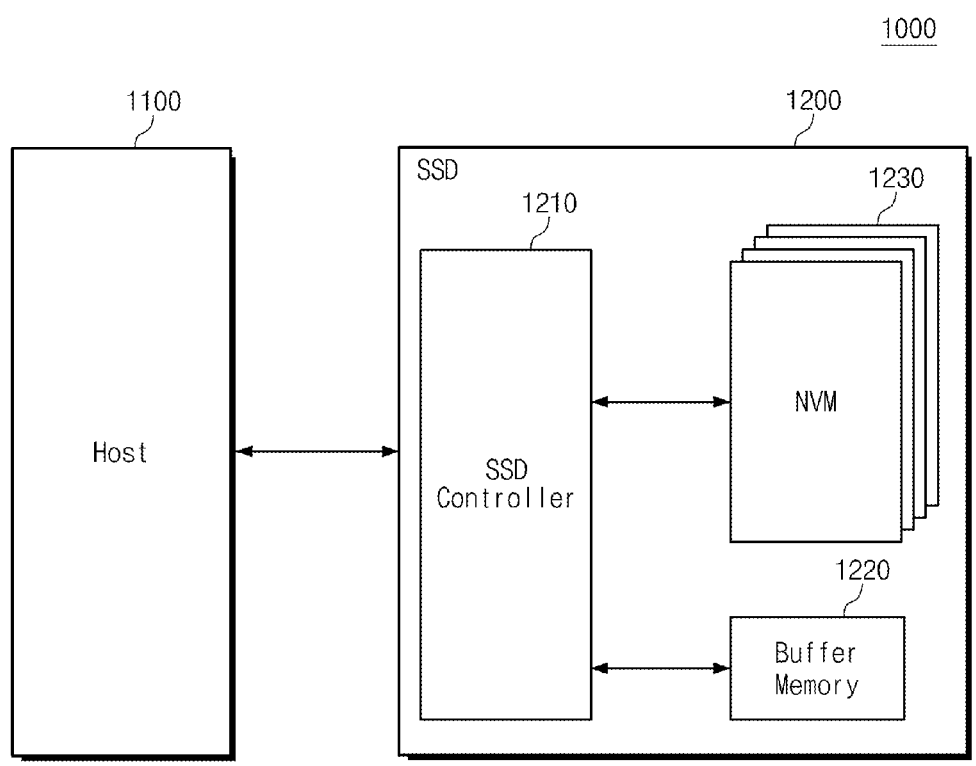
FIG. 16 is a block diagram of a solid state drive (SSD) system according to an embodiment of the inventive concept.

FIG. 16 is a block diagram of a solid state drive (SSD) system according to an embodiment of the inventive concept. Referring to FIG. 16, an SSD system 1000 may include a host 1100 and an SSD 1200. The SSD 1200 may include an SSD controller 1210, a buffer memory 1220, and a non-volatile memory device 1230.

The SSD controller 1210 may provide physical interconnection between the host 1100 and the SSD 1200. That is, the SSD controller 1210 may provide an interface with the SSD 1200 so as to correspond to a bus format of the host 1100. In particular, the SSD controller 1210 may be configured to decode a command provided from the host 1100. The SSD controller 1210 may access the non-volatile memory device 1230 according to the decoding result. The bus format of the host 1100 may include USB (Universal Serial Bus), SCSI (Small Computer System Interface), PCI express, ATA, PATA (Parallel ATA), SATA (Serial ATA), SAS (Serial Attached SCSI), and the like.

Herein, the SSD controller 1210 may use hybrid mapping that uses both the block mapping mode and the page mapping mode to accomplish address mapping. Detecting of a super consecution block and determining of an address mapping mode may be carried out by a host 1100. Alternatively, the SSD controller 1210 may determine a mapping mode based on logical addresses LBA and nSC transferred with a write request.

The buffer memory 1220 may be used to temporarily store write data provided from the host 1100 or data read out from the non-volatile memory device 1230. If data stored in the non-volatile memory device 1230 is cached at a read request of the host 1100, the buffer memory 1220 may provide the cached data directly to the host 1100. That is, the buffer memory 1220 may support a cache function. A data transfer speed determined by the bus format (e.g., SATA or SAS) of the host 1100 may be remarkably higher than that of a memory channel of the SSD 1200. That is, if an interface speed of the host 1100 is extraordinarily rapid, performance lowering due to a speed difference between the bus format and the memory channel may be minimized by using a large buffer memory 1220.

The buffer memory 1220 may be formed of a synchronous DRAM (SDRAM) in order to provide sufficient buffering to the SSD 1200 used as a large volume of an auxiliary storage device. But, it is well understood that the buffer memory 1220 is not limited to this disclosure.

The non-volatile memory device 1230 may be provided as a storage media of the SSD 1200. For example, the non-volatile memory device 1230 may be formed of a NAND-type flash memory having a large storage capacity. The non-volatile memory device 1230 may be formed of a plurality of memory devices. In this case, memory devices may be coupled with the SSD controller 1210 by the channel. The non-volatile memory device 1230 as storage media is not limited to this disclosure. For example, non-volatile memory devices such as PRAM, MRAM, ReRAM, FRAM, NOR flash memory, and the like may be used as the storage media. A memory system including different types of memories can be used for bulk (or media) data storage. Alternatively, a volatile memory device (e.g., DRAM) can be used as the storage media.

Figure 17:
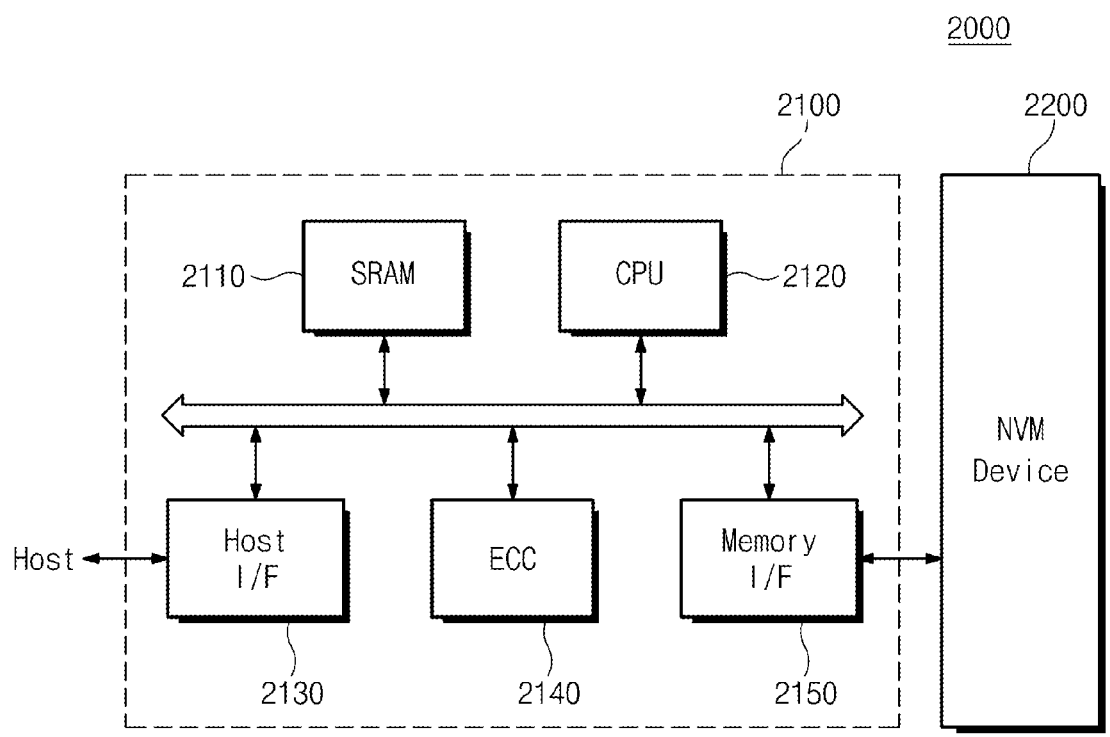
FIG. 17 is a block diagram of a memory system according to an embodiment of the inventive concept.

FIG. 17 is a block diagram of a memory system according to another embodiment of the inventive concept. Referring to FIG. 17, a memory system 2000 may include a non-volatile memory device 2200 and a memory controller 2100.

The memory controller 2100 may be configured to control the non-volatile memory device 2200. The non-volatile memory device 2200 and the memory controller 2100 may constitute a memory card. SRAM 2110 may be used as a work memory of a CPU 2120 as a processing unit. A host interface 2130 may include the protocol for exchanging data with a host coupled with the memory system 2000. An ECC block 2140 may be configured to detect and correct errors in read data retrieved from the non-volatile memory device 2200. A memory interface 2150 may be configured to interface with the non-volatile memory device 2200. The CPU 2120 may perform an overall operation for data exchanging of the memory controller 2100. Although not shown, the memory system 2000 may further comprise a ROM storing code data for interfacing with a host.

Herein, the memory controller 2100 may map a logical address from a host to a physical address of the non-volatile memory device 2200 according to a hybrid mapping approach. Detecting of a super consecution block and determining of an address mapping mode may be carried out by a host (not shown). Alternatively, the memory controller 2100 may determine a mapping mode based on logical addresses LBA and nSC transferred at a write request. The memory controller 2100 may determine either a block mapping manner or a page mapping manner, based on write data stored in the SRAM 2110 according to a write request of a host.

The non-volatile memory device 2200 may be formed of a multi-chip package which includes a plurality of flash memory chips. The memory system 2000 may be provided as a storage media having the high reliability and low error probability. In this case, the memory controller 2100 may be configured to communicate with an external device (e.g., a host) through one of various interface protocols such as USB, MMC, PCI-E, SAS, SATA, PATA, SCSI, ESDI, IDE, and the like.

Figure 18:
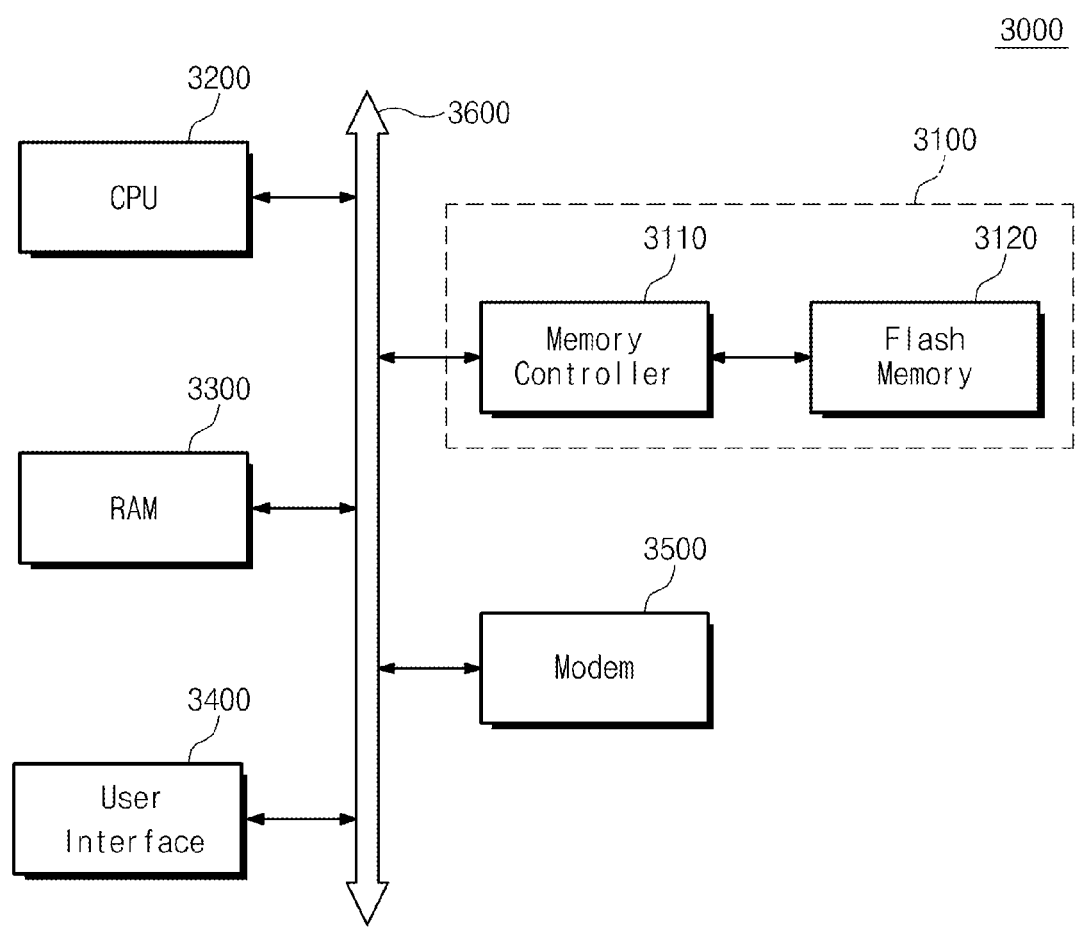
FIG. 18 is a block diagram of a computational system according to an embodiment of the inventive concept.

FIG. 18 is a block diagram of a computational system according to an embodiment of the inventive concept. A computational system 3000 may include a CPU 3200, a RAM 3300, a user interface 3400, a modem 3500 such as a baseband chipset, and a memory system 3100, which are coupled with a system bus 3600.

If the computational system 3000 is a mobile device, it may further comprise a battery (not shown) powering the system. Although not shown in FIG. 18, the computational system 3000 may further comprise an application chipset, a camera image processor (CIS), a mobile DRAM, and the like. The memory system 3100 may be a solid state drive/disk (SSD) which utilizes a non-volatile memory to store data, for example. Alternatively, the memory system 3100 may be formed of a fusion memory (e.g., One-NAND flash memory device).

Herein, the memory system 3100 may include a memory controller 3110 and a flash memory 3120. The memory controller 3110 may map a logical address from a host to a physical address of the flash memory 3120 according to a hybrid mapping manner. Detecting of a super consecution block and determining of an address mapping mode may be carried out by a host (e.g., CPU). Alternatively, the memory controller 3110 may determine a mapping mode based on logical addresses LBA and nSC transferred at a write request.

The respective non-volatile memory devices and/or a memory controllers described above and incorporated within embodiments of the inventive concept may be packaged using various packaging techniques, such as PoP (Package on Package), BGAs (Ball grid arrays), CSPs (Chip scale packages), PLCC (Plastic Leaded Chip Carrier), PDIP (Plastic Dual In-Line Package), Die in Waffle Pack, Die in Wafer Form, COB (Chip On Board), CERDIP (Ceramic Dual In-Line Package), MQFP (Plastic Metric Quad Flat Pack), TQFP (Thin Quad Flatpack), SOIC (Small Outline Integrated Circuit), SSOP (Shrink Small Outline Package), TSOP (Thin Small Outline), TQFP (Thin Quad Flatpack), SIP (System In Package), MCP (Multi Chip Package), WFP (Wafer-level Fabricated Package), WSP (Wafer-Level Processed Stack Package), and the like.

The above-disclosed subject matter is to be considered illustrative, and not restrictive, and the appended claims are intended to cover modifications, enhancements, and other embodiments that within their scope. Thus, to the maximum extent allowed by law, the scope of the claims is to be determined by the broadest permissible interpretation of the following claims and their equivalents, and shall not be restricted or limited to only the foregoing detailed description.

What is claimed is:

1. A hybrid address mapping method for a system including a host and a data storage device, the data storage device including a memory controller directly connected to the host, a buffer memory, and a nonvolatile memory (NVM), the address mapping method comprising:

communicating write data having consecutive logical addresses from the host to the memory controller and storing the write data in a buffer memory, wherein all the logical addresses of the write data are consecutive with one another;

using the memory controller, determining whether the write data includes a super sequential block (SSB) and a residual portion in addition to the SSB;

upon determining that the write data includes the SSB and the residual portion, using a block mapping mode to map a first logical address among the logical addresses associated with the SSB to a corresponding first physical address, while also using a page mapping mode to map a second logical address among the logical addresses associated with a residual portion of the write data excluding write data in the SSB to a corresponding second physical address;

writing the SSB of the write data to the NVM using the block mapping mode; and writing the residual portion of the write data to the NVM using the page mapping mode, wherein the SSB is written such that pages of the SSB are interleaved in a plurality of memory blocks of the NVM using at least two channels.

2. The address mapping method of claim 1, wherein the plurality of memory blocks are distributed over a plurality of non-volatile memory devices forming the NVM.

3. The address mapping method of claim 2, wherein the writing of a page among the pages of the SSB using one of the at least two channels is started before completion of the writing of a previous page among the pages of the SSB using another of the at least two channels.

4. A hybrid address mapping method for a system including a host and a data storage device the data storage device including a memory controller directly connected to the host, a buffer memory, and a nonvolatile memory (NVM), the address mapping method comprising:

communicating a write command from the host to the memory controller, wherein the write command includes write data having consecutive logical addresses wherein the write command is a single write command including the write data, and all the logical addresses of the write data are consecutive with one another;

storing the write data in the buffer memory;

determining whether the write data includes a super sequential block (SSB) and a residual portion in addition to the SSB as the write data is stored in the buffer memory;

selecting a block mapping mode to map a first logical address among the logical addresses associated with the SSB to a corresponding first physical address;

selecting a page mapping mode to map a second logical address among the logical addresses associated with the residual portion of the write data to a corresponding second physical address;

writing the SSB of the write data to the NVM using the block mapping mode; and writing the residual portion of the write data to the NVM using the page mapping mode, wherein the SSB is written such that pages of the SSB are interleaved in a plurality of memory blocks of the NVM using at least two channels.

5. The address mapping method of claim 4, wherein determining whether the write data includes the SSB as the write data is stored in the buffer memory, selecting the block mapping mode, and selecting the page mapping mode are performed by a buffer layer running on the host, the buffer layer being used to control the communication of the write data from the host to the memory controller and the storing of the write data in the buffer memory.

6. The address mapping method of claim 4, wherein the write command further includes an address mapping mode indication defined by the buffer layer and controlling the selecting of the block mapping mode, and the selecting of the page mapping mode.

7. A data storage device comprising:

a buffer memory configured to temporarily store write data having consecutive logical addresses received from a host, wherein all the logical addresses of the write data are consecutive with one another, the write data includes a super sequential block (SSB) and a residual portion in addition to the SSB, and the SSB includes first logical addresses defined by the host and second logical addresses defined by the host;

a non-volatile memory device configured to store the write data; and a memory controller configured receive the write data from a host, and map the first and second logical addresses to respective and corresponding first and second physical addresses of the non-volatile memory device, wherein the memory controller is further configured after storing the write data in the buffer memory to use a block mapping mode for mapping the first logical addresses associated with the SSB of the write data to the corresponding first physical addresses, and to select a page mapping mode for mapping the second logical address associated with the residual portion of the write data to the corresponding second physical addresses, wherein the SSB of the write data is stored in the non-volatile memory using the block mapping mode, and the residual portion of the write data is stored in the non-volatile memory using the page mapping mode, and wherein the SSB is stored such that pages of the SSB are interleaved in a plurality of memory blocks of the nonvolatile memory using at least two channels.

8. The data storage device of claim 7, wherein the memory controller is further configured to program the write data in a distributed manner across a plurality of memory blocks defined in the non-volatile memory device.

9. A user device, comprising:

a host including a file system that generates write data having consecutive logical address, wherein all the logical addresses of the write data are consecutive with one another, the write data includes a super sequential block (SSB) and a residual portion in addition to the SSB, first logical addresses associated with a super sequential block (SSB) and second logical addresses associated with the residual portion of the write data, and a buffer layer that generates an address mapping mode indication used to program the write data in a non-volatile memory device, wherein generation of the mapping mode indication is a function of controlling the storage of the write data in a buffer memory; and a data storage device including the non-volatile memory device, the buffer memory that temporarily stores the write data under the control of the buffer layer, and a memory controller configured to receive the write data from the host, select one of a plurality of mapping modes in accordance with the address mapping mode indication, and map the first and second logical addresses to respective and corresponding first and second physical addresses of the non-volatile memory device according to the selected one of the plurality of mapping modes, wherein the SSB of the write data is stored in the non-volatile memory using a first mapping mode among the plurality of mapping modes, and the residual portion of the write data is stored in the nonvolatile memory using a different second mapping mode among the plurality of mapping modes, and wherein the SSB is stored such that pages of the SSB are interleaved in a plurality of memory blocks of the non-volatile memory using at least two channels.

10. The user device of claim 9, wherein the first mapping mode is a block mapping mode and the second mapping mode is a page mapping mode.

11. The user device of claim 10, wherein the host maps the first logical address to the corresponding first physical address using the block mapping mode.

12. The user device of claim 9, wherein the storing of a page among the pages of the SSB using one of the at least two channels is started before completion of the storing of a previous page among the pages of the SSB using another of the at least two channels.

* * * * *